July 3, 1962
A. SKLAR
3,042,735
BATTERY CORROSION ELIMINATOR
Filed Nov. 16, 1959
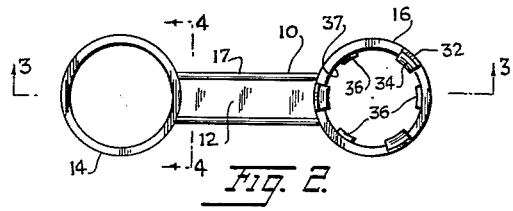
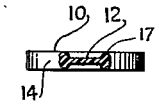
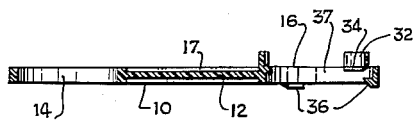
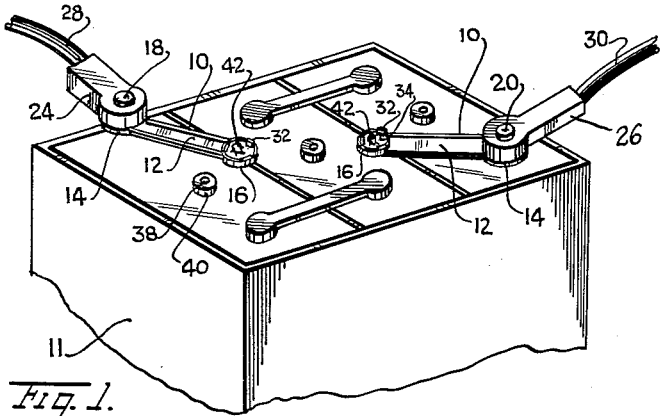
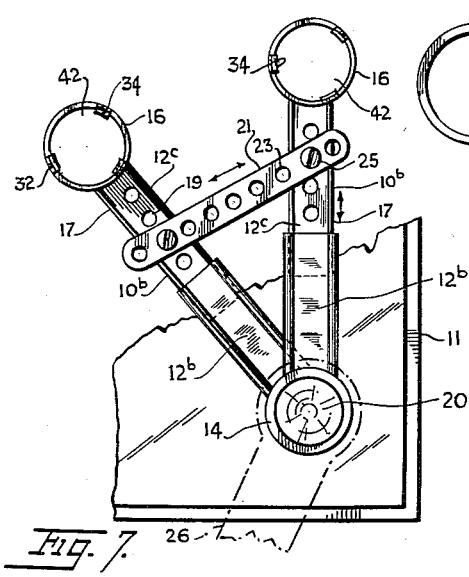
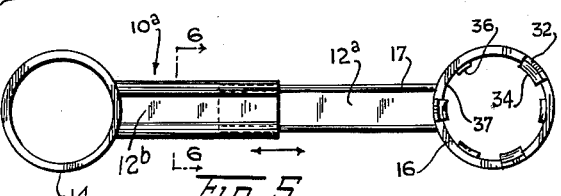
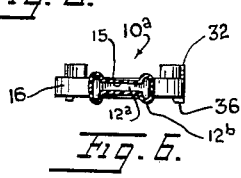
INVENTOR.
ABE SKLAR
BY
*ATTORNEY*

United States Patent Office 3,042,735
Patented July 3, 1962

3,042,735
BATTERY CORROSION ELIMINATOR
Abe Sklar, 75 Omaha Ave., Rockaway, N.J.
Filed Nov. 16, 1959, Ser. No. 853,205
2 Claims. (Cl. 136—181)

The present invention relates generally to anti-corrosion devices and more particularly to a holder for an anti-corroding device used in connection with automobile batteries and similar type batteries.

It is well known that the electrolytic and electrical actions and discharges of wet batteries of this type are attended in use with the rather rapid and ravaging formation and accumulation of corrosion in and around the connections made between the cable clamps and battery posts or terminals; and that these formations and incrustations are attended with adverse effects in the transmission of electric current to the starting motors, in the rapid deterioration of both battery posts and clamps and secondarily in poor service in starting the internal combustion engines.

These accretions are also responsible for sharp impairment in the life of the battery and the frequent scraping and cleaning to remove such accumulations is an expensive nuisance to motorists and others using this type of battery.

While many efforts have been heretofore made to remedy this situation such attempts have heretofore failed to provide a suitable commercial article of a simplicity and economy of construction that recommends itself alike to manufacturers and purchasers and such is the general aim, object and purpose of the present invention.

A further object is to provide an extension holding device for a circular copper member such as a disk, the device being adapted to fit on a battery terminal and hold the copper member in a position for most effective reaction with acid fumes arising from the battery.

Another object is to provide a plastic holding device for a copper disk, the device being provided with a ring for snapping the disk therein and for similarly removing the disk therefrom for replacement by another one.

Still another object is to provide a plastic extension holding device having telescopic members adapted to hold a copper member in optimum position for reaction with acid fumes arising from a battery.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a portion of a battery with a holder embodying the invention mounted thereon.

FIG. 2 is a top plan view of the device embodying the invention.

FIGS. 3 and 4 are sectional views taken on lines 3—3 and 4—4 of FIG. 2.

FIG. 5 is a top plan view of a holder embodying a modification of the invention.

FIG. 6 is a sectional view taken on line 6—6 of FIG. 5.

FIG. 7 is a top plan view of a portion of a battery with a holder embodying a further modified form of the invention.

Referring to FIGS. 1–4, there is shown a disk holding device 10 having a plastic body formed with a central bar 12 terminating at opposite ends in rings 14 and 16. Bar 12 is reinforced with ridges 17 on its long edges. Ring 14 is adapted to fit snugly and tightly on a conical terminal of a wet cell acid battery. Two identical devices 10 are shown carried on the two terminal posts 18 and 20 located near diagonally opposite corners of battery 11. Terminal clamps 24 and 26 of cables 28, 30 fit on the posts and prevent the rings 14 of the holders 10 from coming loose or turning around on the posts.

Ring 16 of each holder 10 is formed on its upper side with three spaced upwardly extending guide lugs 32 having lower tapered radially inwardly extending teeth 34. Three further teeth 36 are located circumferentially between teeth 34 and are located on the underside of ring 16. Teeth 36 also extend radially inward of the ring.

The entire body of the holder is preferably formed of a semirigid or stiffly resilient plastic material such as heavy gauge vinyl, polyethylene, or the like. This material is inert chemically in the presence of acid fumes arising from the vents 38 in the caps 40 on the several cells of the battery.

Rings 14 are sufficiently flexible so that they grip the posts 18 and 20 quite securely and the engagement is reinforced by the presence of the clamps 24 and 26. Rings 16 are likewise sufficiently flexible so that they will receive copper disks 42 between the teeth 34 and 36. Each disk can be snapped past the flexible teeth 34 or 36 into the cavity defined by the inner wall 37. By exerting pressure manually on the disk axially of the ring 16, the disk can be forced past the flexible teeth in one direction or another. Lugs 32 guide the disk during insertion into ring 16.

Bar 12 serves as an arm extending radially from each terminal post for locating the ring 16 in an optimum location for most effective interception of acid fumes arising from the vents 38 for chemical reaction therewith. During normal operation of the battery these fumes will arise and will be intercepted by the copper disks. The disks will corrode as a result. When the disks become so corroded that they are no longer effective to react with further fumes they may readily be replaced upon removal from the rings 16. It has been found that one or two metal members, preferably copper disks, are sufficient to keep the acid fumes normally arising from the battery 11 from corroding metal parts such as terminals of the battery and cables, frame supports for the battery and other nearby metal parts generally present in vehicles where such wet cell acid batteries are used.

In the form of the invention shown in FIGS. 5 and 6, holder 10$^a$ is provided with one solid arm 12$^a$ secured to and integral with ring 16 and another arm 12$^b$ secured to and integral with ring 14. Arm 12$^b$ is hollow and has a cavity 15 telescopically receiving arm 12$^a$ with a snug friction fit. This structure permits the ring 16 to be adjustably positioned from the ring 14 as arm 12$^a$ is extended more or less selectively into arm 12$^b$.

In order to reinforce the structure of arms or bars 12 and 12$^a$ they are preferably formed with ridges 17 at their edges on both sides. The cavity 15 in arm 12$^b$ is formed with recesses to correspond in shape with the ridges 17.

In the form of the invention shown in FIG. 7, two holding devices 10$^b$ are adjustably mounted on battery terminal post 20. Clamp 26 is removed from post 20. Rings 14 of the holders are superimposed on one another around the post. A hollow arm 12$^b$ is secured to each ring 14 and telescopically receives solid arm 12$^c$. Arm 12$^c$ is formed with a plurality of spaced holes 19. A brace bar 21 having spaced holes 23 may be secured across the arms 12$^c$ of the respective holders 10$^b$ to fix the holders in a desired angular disposition with rings 16 spaced a desired distance apart. Each ring 16 carries a metal disk 42 removably therein. Screws 25 may be inserted through registering holes 19 and 23 to maintain the fixed angular disposition of the holders. When the clamp 26 is placed on the post, then the holder assembly will be prevented from rotating on the post. The arrangement of the assembly of FIG. 7 permits more than two disk holders to be angularly arranged around a terminal post of a battery. Since the holders 10$^b$ all have telescopic arms, considerable latitude of adjustment in positioning is possible.

The holders described can be manufactured very inexpensively on generally available plastic molding machinery. The holders are durable in construction and have long, useful lives. They are simple to attach and detach from the battery terminals and permit ready insertion and detachment of metal disks 42.

This arrangement may be used as an anti-corrosion means for batteries, battery hold-down frames, or for other similar devices.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A holder for an anti-corroding device for a wet cell acid battery comprising a flat rectangular-shaped body composed of two telescopic sections, each section having a ring on its outer end, one of said rings having a plurality of spaced resilient teeth on its inner periphery on one side thereof and having a plurality of lugs on said inner periphery between said teeth on the other side thereof, said teeth and lugs extending radially inward and adapted to hold a circular flat copper member.

2. A holder assembly for anti-corroding devices for a wet cell acid battery comprising a pair of flat rectangular-shaped bodies, each body composed of two telescopic sections, each section having a ring on its outer end, one section of the body having a series of spaced holes therealong, the ring on the end of the other section of the body having spaced resilient teeth on its inner periphery on one side thereof and having spaced lugs on said inner periphery between said teeth, on the other side thereof, said teeth and lugs of each ring extending radially inward adapted to hold a circular flat copper member, and an elongated flat bar with a series of spaced holes therealong adapted to extend across the perforated sections of the bodies, the holes in the bar and the holes in the perforated sections adapted to be aligned to receive fastening elements for holding the bodies spaced apart.

References Cited in the file of this patent

UNITED STATES PATENTS

| | | |
|---|---|---|
| 809,896 | Bender | Jan. 9, 1906 |
| 2,049,820 | Myhre | Aug. 4, 1936 |
| 2,051,345 | Reynolds | Aug. 18, 1936 |

FOREIGN PATENTS

| | | |
|---|---|---|
| 224,345 | Great Britain | Nov. 13, 1924 |

OTHER REFERENCES

"Motor Guide," September 1959, page 70.
"Popular Mechanics," September 1959, page 181.